UNITED STATES PATENT OFFICE.

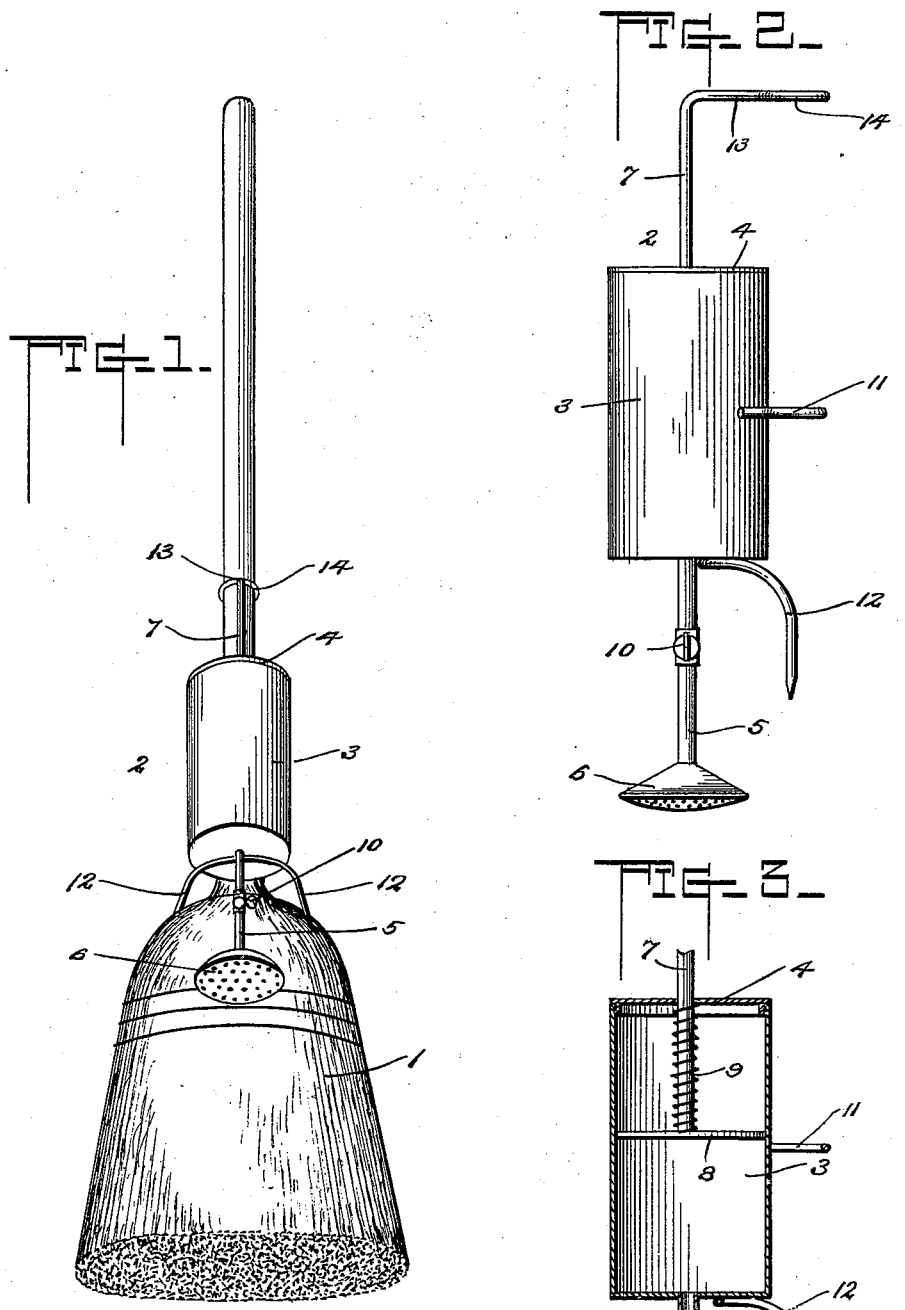

HENRY BROCKMANN, OF SANTA ROSA, CALIFORNIA.

SPRAYING ATTACHMENT FOR BROOMS.

SPECIFICATION forming part of Letters Patent No. 595,761, dated December 21, 1897.

Application filed May 25, 1897. Serial No. 638,115. (No model.)

*To all whom it may concern:*

Be it known that I, HENRY BROCKMANN, a citizen of the United States, residing at Santa Rosa, in the county of Sonoma and State of California, have invented certain new and useful Improvements in Spraying Attachments for Brooms; and I do declare the following to be a full, clear, and exact description of the invention, such as will enable others skilled in the art to which it appertains to make and use the same.

My invention has relation to a spraying attachment for brooms.

The object of the invention is to provide a device of this character which may be easily attached to brooms and by the employment of which dust will be prevented from rising during the sweeping.

With this object in view the invention consists of certain features of construction and combination of parts, which will be hereinafter fully set forth and claimed.

In the accompanying drawings, Figure 1 is a perspective view of a broom, showing my improved spraying attachment secured thereto. Fig. 2 is a side view of the spraying attachment removed, and Fig. 3 is a longitudinal vertical sectional view taken through the spraying attachment.

In said drawings, 1 denotes a broom, which may be of any well-known or approved form, and 2 denotes the spraying attachment. This attachment consists of a tank 3, having a screw-threaded cover 4, and a discharge-pipe 5, having a spraying-head 6. The cover has a screw-threaded engagement with the tank, and passing through an aperture in the cover is a piston-rod 7, having a piston 8, which is forced downwardly by a coiled spring 9, attached to the piston-rod and to the cover of the tank. The discharge-pipe of the tank is provided with a controlling-valve 10.

11 denotes a loop which is secured to the side of the tank and which is adapted to engage the broom-handle, and 12 denotes two curved arms which are adapted to rest upon the shoulders of the broom and support the tank. To further steady the tank, the piston-rod is provided with a lateral extension 13, formed with an eye 14, which also engages the broom-handle.

In sweeping by turning on the valve a fine spray will be discharged upon the floor or carpet, thus preventing the rising of dust.

The device is exceedingly simple, and may be easily attached to or removed from any of the brooms now in use.

Having thus described my invention, what I claim, and desire to secure by Letters Patent, is—

A broom attachment for the purpose described, consisting of a tank provided with a discharge-pipe having a spraying-head and a controlling-valve, a piston, means for exerting a downward pressure upon the piston to force the fluid contained in the tank through the spraying-head, a loop 11 secured to the side of the tank and one secured to the upper end of the piston-rod, said loops adapted to slip over the handle of the broom, and a pair of outwardly and downwardly projecting prongs or arms adapted to penetrate the shoulder of the broom and support the tank, substantially as set forth.

In testimony whereof I hereunto affix my signature in presence of two witnesses.

HENRY BROCKMANN.

Witnesses:
 M. S. DEARBORN,
 E. L. DUTCHER.